United States Patent

[11] 3,578,845

[72] Inventors Robert E. Brooks
  Redondo Beach;
  Lee O. Heflinger, Torrance; Ralph F. Wuerker, Palos Verdes, Calif.
[21] Appl. No. 704,884
[22] Filed Feb. 12, 1968
[45] Patented May 18, 1971
[73] Assignee TRW Inc.
  Redondo Beach, Calif.

[54] HOLOGRAPHIC FOCUSING DIFFRACTION GRATINGS FOR SPECTROSCOPES AND METHOD OF MAKING SAME
  4 Claims, 9 Drawing Figs.

[52] U.S. Cl. .................................................. 350/162R,
  350/3.5, 356/79
[51] Int. Cl. .................................................. G02b 5/18,
  G01j 3/18
[50] Field of Search .................................... 350/162, 162 (ZP), 3.5

[56] References Cited
UNITED STATES PATENTS
2,464,738  3/1949  White et al. .................. 350/162X
3,405,614  10/1968  Lin et al. .................. 350/(162ZP)UX
3,506,327  4/1970  Leith et al. .................. 350/3.5

OTHER REFERENCES
George et al. " Holographic Diffraction Gratings" APPLIED PHYSICS LETTERS Vol. 9, No. 5, Sept. 1, 1966, pp. 212— 215. 350/162.

Kock " Three-Color Hologram Zone Plates" PROCEEDINGS OF THE IEEE Vol. 54, No. 11, Nov. 1966, pp. 1610— 1612. 350/162(ZP).
Schwar et al. " Point Holograms as Optical Elements" NATURE Vol. 215, No. 5098, July 15, 1967, pp. 239— 241. 350/162(ZP).
Sincerbox " Formation of Optical Elements By Holography" IBM TECHNICAL DISCLOSURE BULLETIN Vol. 10, No. 3, Aug. 1967, pp. 267, 268. 350/162(ZP).
Rogers " Gabor Diffraction Microscopy: the Hologram as a Generalized Zone-Plate" NATURE Vol. 166, No. 4214, Aug. 5, 1950, p. 237. 350/3.5.
Denisyuk " On the Reproduction of the Optical Properties of An Object By The Wave Field of Its Scattered Radiation" Optics & Spectroscopy Vol. 15, No. 4, Oct. 1963, pp. 279— 284. 350/3.5.

*Primary Examiner* —John K. Corbin
*Attorneys* —Daniel T. Anderson, Edwin A. Oser and Jerry A. Dinardo

ABSTRACT: A method making a focusing diffraction grating including casting a diverging beam of coherent light on a photographic plate, casting a convergent beam of coherent light on the same plate so that the beams interfere with each other on the light-sensitive plane of the plate, and then developing the plate. A holographic focusing diffraction grating having a plurality of curved, spaced grating lines on the face of the grating, the lines having specific curves and spacing relating to specific predetermined wavelengths of light for diffracting specific wavelengths of light at predetermined angles. A spectroscope, spectrograph, or spectrometer having a holographic focusing diffraction grating.

R.E. Brooks
Lee O. Heflinger
Ralph F. Wuerker
INVENTORS

BY

ATTORNEY

R. E. Brooks
Lee O. Heflinger
Ralph F. Wuerker
INVENTORS

BY [signature]

ATTORNEY

R. E. Brooks
Lee O. Heflinger
Ralph F. Wuerker
INVENTORS

ATTORNEY

HOLOGRAPHIC FOCUSING DIFFRACTION GRATINGS FOR SPECTROSCOPES AND METHOD OF MAKING SAME

BACKGROUND OF THE INVENTION

This invention relates generally to the field of holography and, more particularly, to focusing diffraction gratings made as holograms, and to spectroscopes in combination with a diffraction grating according to the invention.

Holography (or lens-less photography) is based upon the recording on a photographic film or plate of a diffraction pattern created by the interference between light scattered from an object or scene that has been illuminated with coherent light and light directly impingent upon the film from the same light source. The exposed film is then developed and, upon illumination with coherent light while positioned in the same geometric relation to the light as it was while being exposed, produces a diffracted beam which is a reconstruction of the original pattern scattered from the scene at the time of the exposure.

Transmission diffraction gratings generally consist of lines ruled, several thousand to the inch, on a glass by a diamond point. Reflection diffraction gratings are made by ruling lines on a polished surface of a speculum metal and from which the incident light is reflected by the polished strips between the rulings. Such gratings are ruled in straight lines by entirely automatic machines. These machines must be extremely precise and because of this requirement, the machines and the resulting gratings, limited to straight lines, are extremely expensive. The cost of such gratings also makes spectroscopes, spectrometers and spectrographs very expensive.

Another type of diffraction grating which is substantially impossible to make with a machine or otherwise is a focusing plane grating. These are of two general types, referred to as a cylindrically focusing grating and a spherically focusing grating. They are made having curved lines and the difficulty encountered in attempting to make such gratings with machines or by hand is obvious.

SUMMARY OF THE INVENTION

It has been surprisingly found that focusing diffraction gratings of good quality can be made by holographic techniques. By splitting a laser beam, continuous or pulsed, into one convergent and one divergent beam, and causing them to interfere with each other on the light-sensitive plane of a previously unexposed photographic plate produces a good quality focusing diffraction grating. Where the lenses used for the converging and diverging beams have spherical surfaces, the grating is made from spherical waves of light and is a spherically focusing grating, and when the lenses are cylindrical so as to produce cylindrical waves, the gratings are cylindrically focusing.

The grating spacing of the lines may be accurately determined by the beam angle as the angle of diffraction depends upon the wavelength of light in the respective beams. The focusing gratings produce curved diffraction lines on the gratings and they are produced in predeterminable configurations in that they depend upon the wavelengths of light which are easily determinable.

The holographic method of producing focusing diffraction gratings permits the construction of simple and inexpensive spectrometers of high quality. This is because the equipment used to make them is much less expensive than a conventional ruling engine; the materials are low cost, and the production process is rapid. The quality of the resulting gratings are as good as the optics used to produce them.

Reflection gratings can also be made, as indicated above, by aluminizing the emulsion surface of the developed hologram plate. Other metals, such as gold, silver, platinum, nickel, rhodium, chromium or copper, or alloys thereof, may be used to provide a reflective surface film. Such films may vary in thickness from 100 Angstroms to 5 microns. At 100 Angstroms, the reflective surface will, in most cases, render the hologram transparent as well as reflective. The use of reflection gratings permit the diffraction of ultraviolet light which is not possible with a transmission glass grating.

The three-dimensional nature of the photographic emulsion in the holograms enables the production of transmission holographic focusing gratings which functionally behave as blazed gratings, with which light can be preferentially diffracted into desired orders.

When a very thick emulsion is used and the silver grains are bleached out or substituted by other chemicals after the development of the hologram plate so as to leave only refractive index changes thereon, most of the radiant energy passing through the grating can be of a selected order. The thickness of the emulsion for this purpose should be in the range of from 1 to 1000 microns, and as found in a 649F-type plate.

Accordingly, objects of the invention are to provide the method for making and the resulting products comprising of very large, high-resolution, low f/number, low-cost gratings, and spectroscopes, spectrometers and spectrographs of high quality. In addition, holographic gratings are free of "ghost" images which are found in many ruled gratings.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

BRIEF DESCRIPTION OF THE PREFERRED EMBODIMENTS

Figure 1:
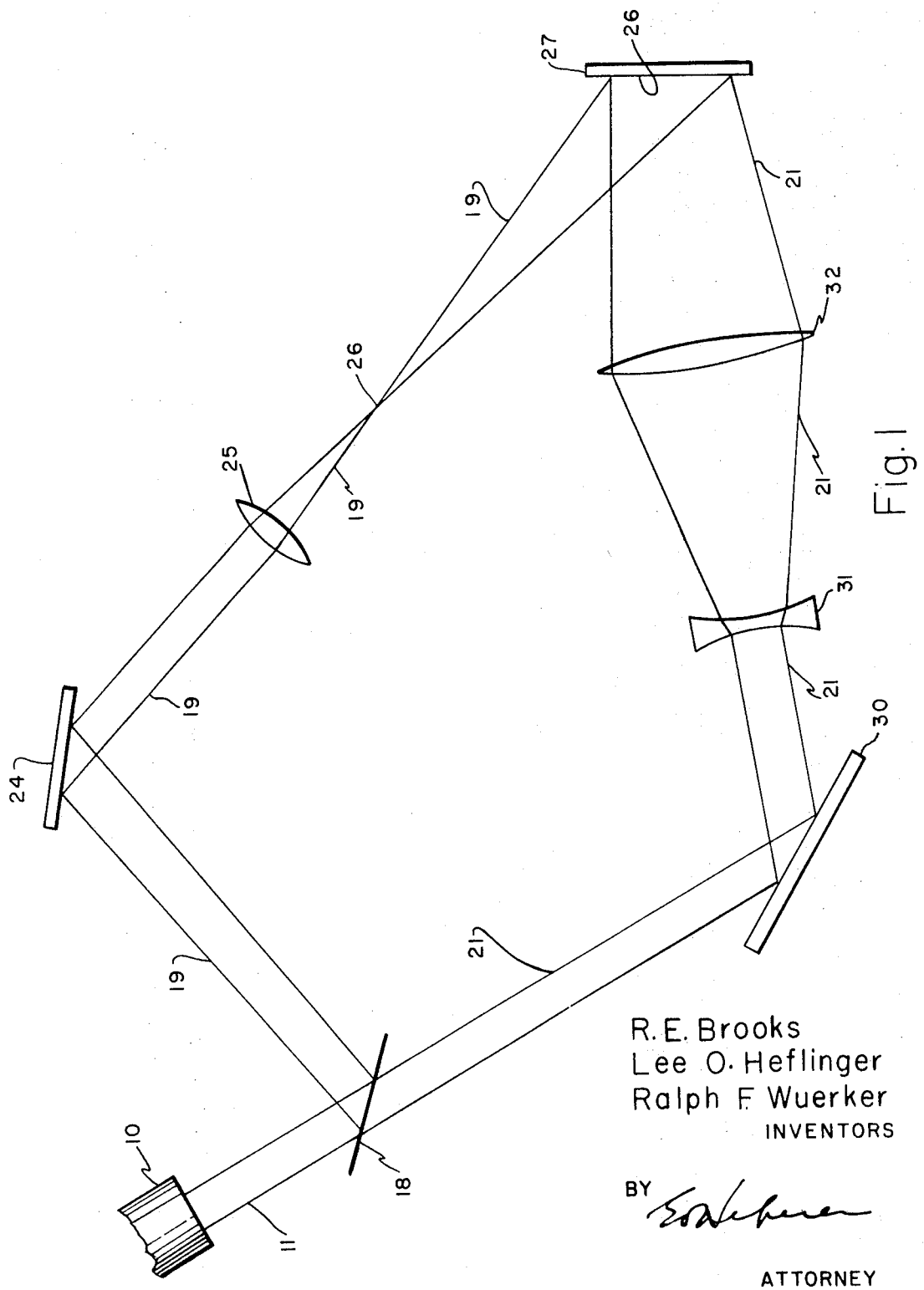
FIG. 1 illustrates a split beam holographic photography arrangement for making a spherically focusing grating on a holographic plate.

Referring again to the drawings, there is shown in FIG. 1 a gas laser 10 emitting a continuous beam of coherent light 11. This beam is directed onto a beam splitter 18, which splits the beam, reflecting beam 19 and permitting beam 21 to pass therethrough. The beam 19 is directed onto a mirror 24 from which it is reflected to pass through a spherical, positive lens 25, which causes the beam to converge at 26 and then diverge, to be cast upon a photosensitive plane face 26 of a high-resolution photographic plate 27, such as a Kodak 649F plate or other well-known light-sensitive materials.

The beam 21, after passing through the beam splitter, is directed onto a mirror 30 from which it is reflected to pass through a spherical, negative lens 31 used to diverge the beam. It next passes through a spherical, positive lens 32 which causes the beams to converge and be cast upon the face 26 of the photographic plate 27. The beams 19 and 21 are composed of spherical waves having been passed through spherical lenses. The lenses are arranged so that when the beams 19 and 21 strike the plate face 26, they form an interference pattern which is recorded, creating a hologram.

Figure 3:
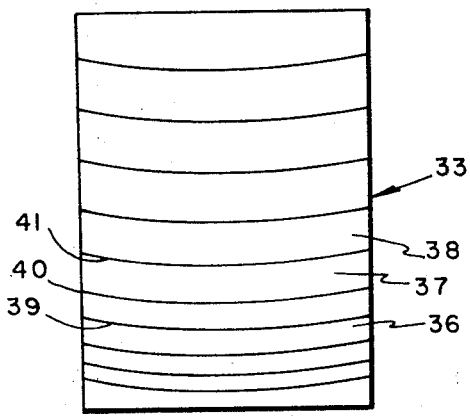
FIG. 3 is a plan view of a spherically focusing grating hologram of a type which may be made as shown in FIG. 1.

The pattern recorded is shown in the hologram 33, of FIG. 3, which has been typically made by developing the exposed plate 27. On the emulsified face of the hologram, there is a spherically focusing grating formed of developed and exposed areas, as 36, 37 and 38, greatly exaggerated in width, which are darkened due to the exposure. Between the exposed areas are grating lines as 39, 40 and 41 to form the spherically focusing grating lines. The various lines, about 20,000 to an inch, have been unexposed. The spacing between the lines is increased from the bottom to the top of the hologram, but is of a predeterminable shape and spacing which may be determined mathematically. The grating spacing is accurately predetermined by the beam angle and the angle of the diffraction depends upon the wavelength of the light. By the proper selection of the beams, the grating spacing and focal length are determined.

Figure 2:
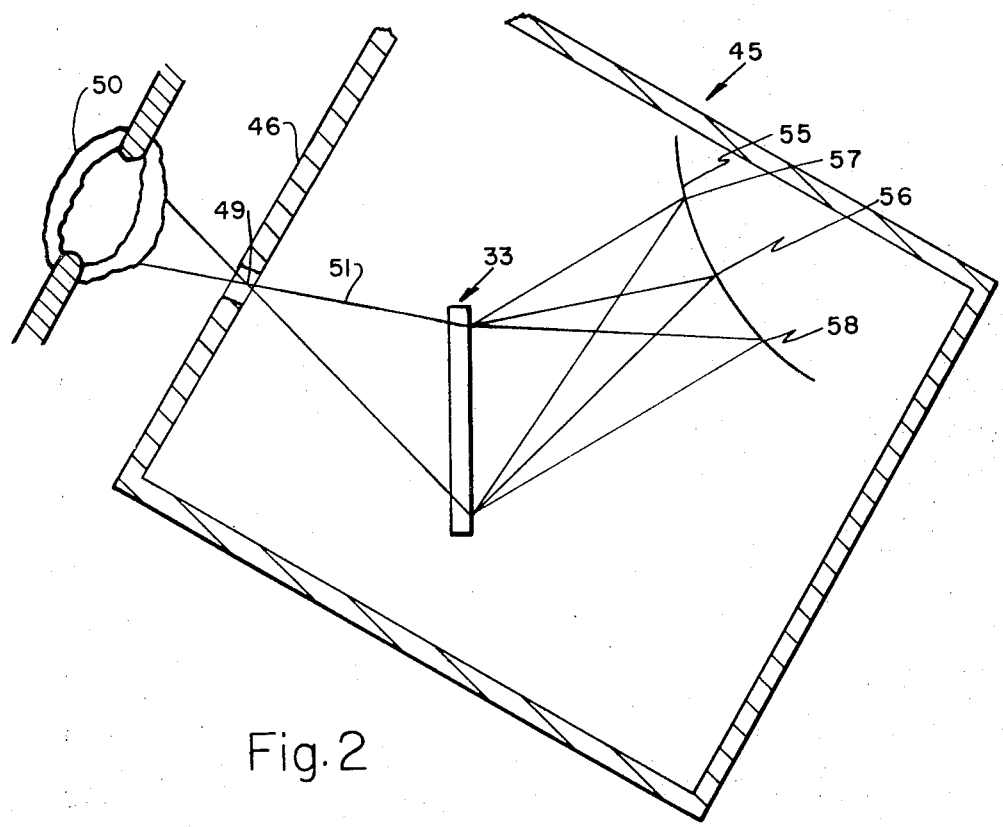
FIG. 2 is a schematic view of a lens-less spectrograph using a focusing grating hologram as may be made as indicated in FIG. 1.

In FIG. 2, there is shown a lens-less spectrograph 45 employing the spherical focusing grating or hologram 33. Through a sidewall 46 is a slit 49 permitting the entry of light from a spectral source 50, which may be the arc from an arc discharge device. Here the light beam 51 strikes the grating 33 at substantially the same angle as does the beam 19 in FIG. 1. The wavelength of the monochromatic light from the point source 26 in FIG. 1 has about the same wavelength as the converging beams which strike a cylindrically curved unexposed photographic plate 55 at a point 56. Because the grating 33 has the ability to focus, the plate 55 is curved to receive a spectrum of given wavelengths at different points on the cylindrical curve. Thus, at the point 57, the wavelength of the beams converging at the point is less than that at the point 56, and those that converge at the point 58 have a greater wavelength than those beams that converge at the point 56.

The accuracy of such a spectrograph (or spectrometer) is dependent upon the quality of the optical elements used to make it. The focusing hologram grating is theoretically perfect only at the wavelength at which it was produced. It, therefore, has aberration at other wavelengths. Whether these are greater than those of a system using lenses is a matter of design. Thus, a focusing hologram grating is most useful at wavelengths near that at which it was produced. In addition to being very inexpensive to make, holographic focusing gratings do not produce ghost images which are typically seen in machine-made diffraction gratings.

Figure 4:
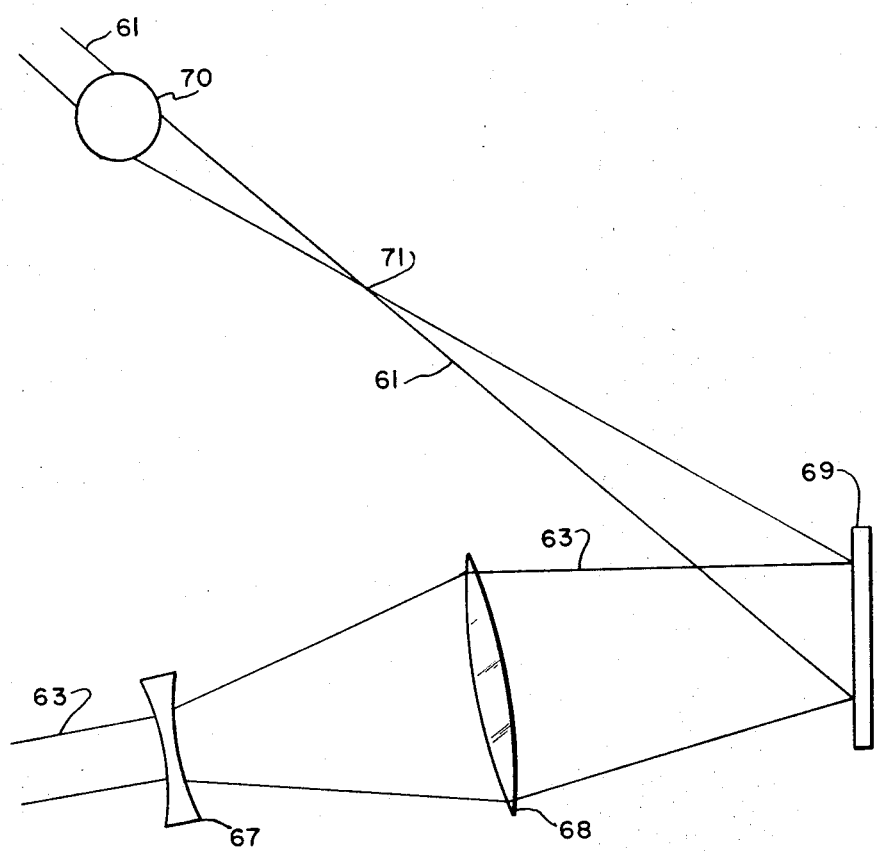
FIG. 4 is a fragmentary view of an arrangement for making a holographic focusing grating by the interference of spherical lightwaves and cylindrical lightwaves on a photographic plate.

In FIG. 4, there are shown two sets of beams 61 and 63 of coherent light which have been split after being produced by a gas laser in the same manner as were the beams 19 and 21 in FIG. 1. The beam 63 is passed through a spherical negative diverging lens 67 and then through a spherical positive lens 68 to produce an enlarged converging beam which is cast upon an unexposed photographic plate 69. The beam 61 is passed through a cylindrical lens 70 and is caused to converge at a point 71 and then formed into a diverging beam 61 in cylindrical waves and so as to interfere with the spherical waves of light in the beam 63 on the photosensitive face of the plate 69.

Figure 5:
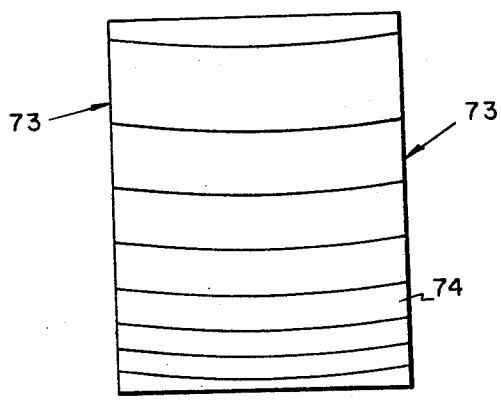
FIG. 5 is a plan view of a grating of the type which may be made from the arrangement shown in FIG. 4.

In FIG. 5, there is shown a focusing grating 73 developed from the plate 69 and having typically, slightly curved lines 74. Lines 74 produce a combination of cylindrically and spherically focused gratings, the number and size of the spaces relative to the number of lines being greatly exaggerated.

Figure 6:
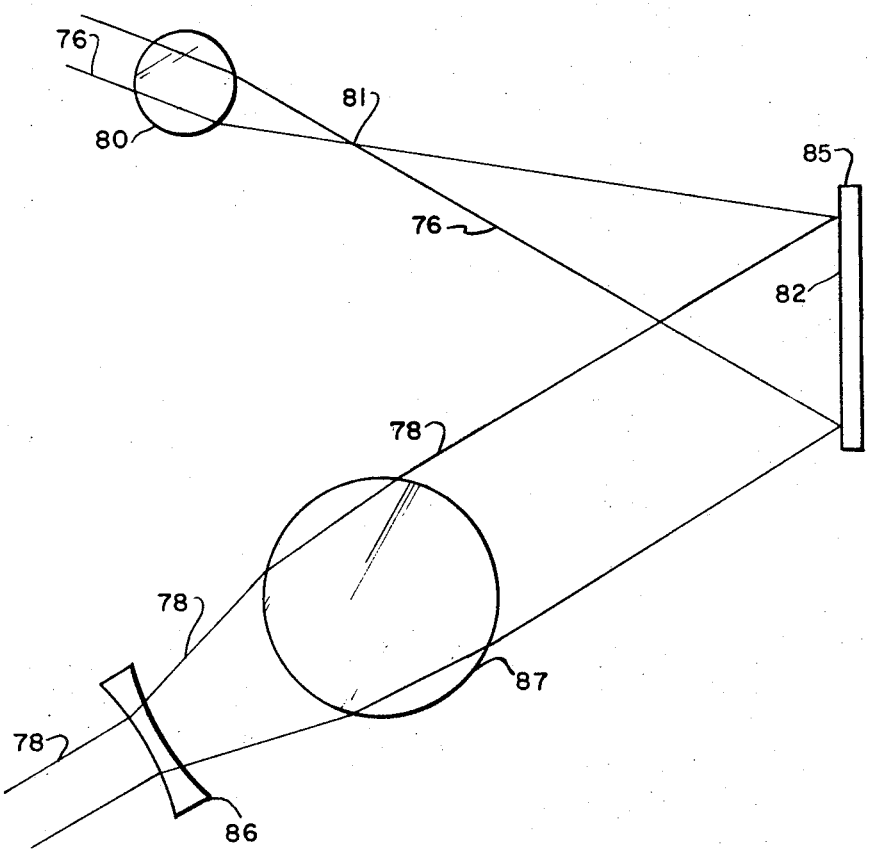
FIG. 6 is a fragmentary diagrammatic view of an arrangement for making cylindrically focusing gratings.
Figure 7:
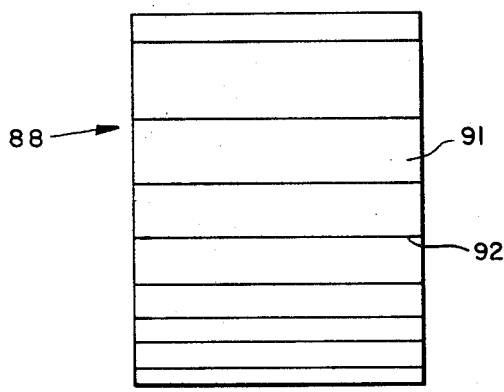
FIG. 7 is a plan view of a cylindrical focusing grating which may be made according to the arrangement shown in FIG. 6.

In FIG. 6, there are two sets of beams 76 and 78 which have been split from a laser beam as described above. The beam 76 is directed through a cylindrical lens 80 by which it is converged at a point 81 and then formed into a converging beam so as to strike the unexposed face 82 of a photographic plate 85 in the form of a cylindrical wavefront. The beam 78 is directed through a concave diverging lens 86 and then it is directed into a converging cylindrical lens 87, and from which they are cast upon the unexposed face 82 of the plate in the form of a converging cylindrical wavefront which interferes with the front of the beam 76. Focusing mirrors could be used in place of the cylindrical lenses to produce the same result. When the plate 85 is developed, there is formed a cylindrically focusing grating 88, as shown in FIG. 7. The cylindrically focusing grating has a multiplicity of typically, straight lines 92 and exaggerated spaces 91 in the form shown.

Figure 8:
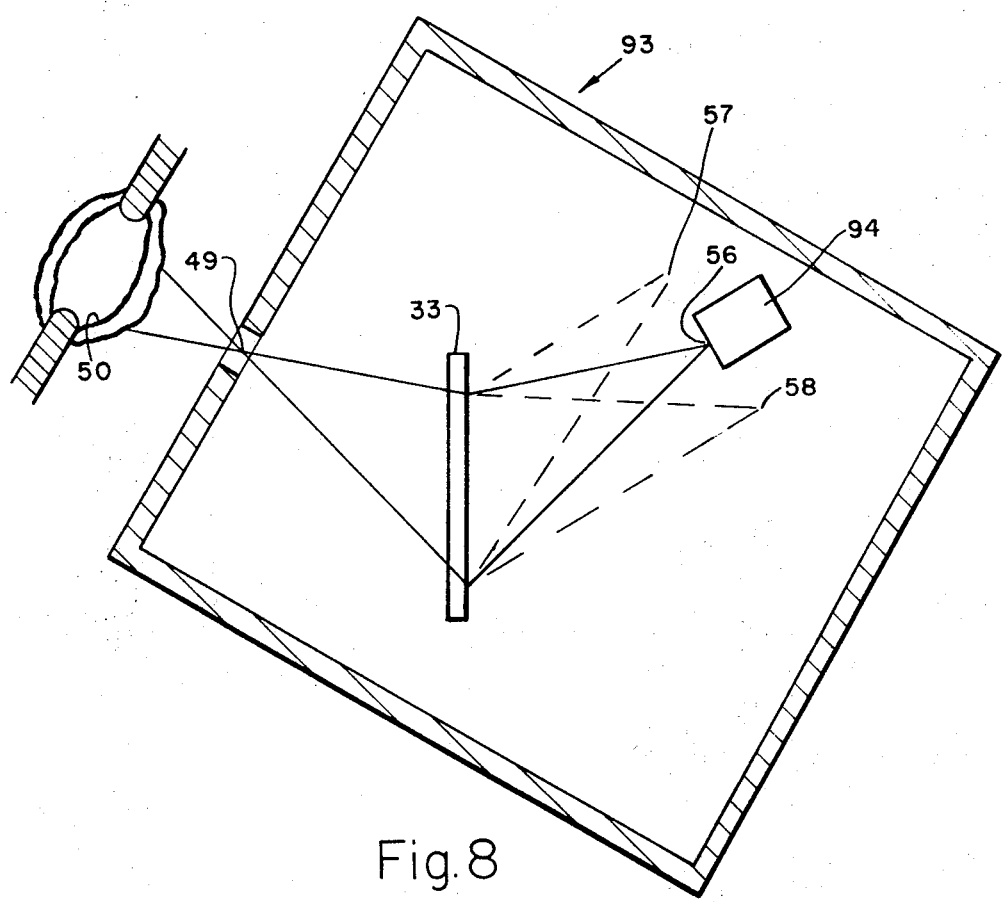
FIG. 8 is a diagrammatic view of a lens-less spectrometer having a photomultiplier tube to indicate a specific wavelength observed.

In FIG. 8, there is shown a spectrometer 93 which contains the same elements as the spectrograph as shown in FIG. 2, except that here, instead of the photographic plate 55, there is a photomultiplier tube 94. The photomultiplier tube is positioned to indicate the reception of only one wavelength of light after it has passed through the grating 33. Thus, there may be other wavelengths as at 57 and 58, but they will not be detected by the photomultiplier tube. The only wavelength that will be detected is that which travels to a point 56 in a position to be received by the tube.

Figure 9:
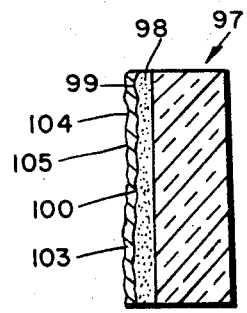
FIG. 9 is a cross-sectional end view of a reflective focusing grating which may be used in ultraviolet light.

In FIG. 9, there is shown a cylindrically or spherically focusing grating 97, which could have been exposed in any of the above-indicated arrangements of converging and diverging interfering coherent light beams.

During the development of the emulsion on such an exposed plate, some of the emulsion material is removed and the outer surface of the emulsion then has a substantially corrugated surface so as to have a series of alternate rows of peaks and nadirs. After the development, the surface of the emulsion is coated with a thin film of reflective material, such as one of the metals indicated above, by means of, for example, vacuum evaporation or chemical deposition. To avoid excessive drying of the emulsion, the evaporator, when used, is pumped down quickly and this results in a coating of good durability. The film thicknesses are in a range from 100 Angstroms to 5 microns, and the films follow the contours of the peaks and nadirs of the outer emulsion surface. A Kodak 649F plate may be used, for example.

The developed plate 97 has on one surface a developed emulsion 98 having in cross section alternate peaks 99 and the nadirs 100. Coated on top of the emulsion is a reflective film 103, following the form of the emulsion surface, and having corresponding peaks 104 and nadirs 105. As shown, the thicknesses of the emulsion and reflective surface are considerably exaggerated. Such a grating may be used to reflect ultraviolet light spectra in an ultra violet spectrograph.

Where the reflective coating is not made thick enough to make the grating opaque, then the grating can be used for reflective viewing as well as transmission viewing as shown in FIG. 2 and FIG. 8. The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described as being merely by way of example. We do not wish to be restricted to the specific forms shown or uses mentioned, except as defined by the accompanying claims, wherein various portions have been separated for clarity of reading and not for emphasis.

We claim:

1. A focusing diffraction and dispersing grating, comprising a hologram made in the process of:

a. simultaneously casting a divergent beam of coherent light and a convergent beam of coherent light on the same surface and from the same side of a light-sensitive means disposed in a plane so that said beams interfere with each other on the said light-sensitive surface only of said light-sensitive means; and b. developing said light-sensitive means.

2. A focusing diffraction grating as defined in claim 1 wherein each of said beams of coherent light has a spherical wavefront.

3. A focusing diffraction grating as defined in claim 1 wherein one of said beams of coherent light has a cylindrical wavefront and the other beam of coherent light has a spherical wavefront.

4. A focusing diffraction grating as defined in claim 1 wherein each of said beams of coherent light has a cylindrical wavefront.